United States Patent [19]

Walburn et al.

[11] Patent Number: 4,893,532
[45] Date of Patent: Jan. 16, 1990

[54] BREAK AWAY TOOL ELEMENT AND METHOD OF MOUNTING

[75] Inventors: Harold E. Walburn, Elmira; Jayesh B. Patel, Horseheads; Jeffery W. Thomason, Odessa, all of N.Y.

[73] Assignee: Hardinge Brothers, Inc., Elmira, N.Y.

[21] Appl. No.: 199,090

[22] Filed: May 26, 1988

[51] Int. Cl.[4] .................... B23B 23/00; B23B 19/00
[52] U.S. Cl. .................................. 82/148; 82/142; 408/710; 409/134; 248/900
[58] Field of Search ............... 82/28 R, 31, 32; 408/234, 710; 409/134, 235, 241; 248/558, 900

[56] References Cited

U.S. PATENT DOCUMENTS

| 1,772,940 | 8/1930 | Forsberg | 82/31 |
|---|---|---|---|
| 2,243,588 | 5/1941 | Wahnish | 82/31 |
| 2,357,062 | 8/1944 | Stoll | 82/28 R |
| 2,470,871 | 5/1949 | Schwantes et al. | 82/28 R |
| 2,572,696 | 10/1951 | Bruet | 82/31 |
| 2,802,385 | 8/1957 | Schmidt | 82/31 |
| 4,506,569 | 3/1985 | Brown et al. | 82/32 |
| 4,536,112 | 8/1985 | Horsky et al. | 409/134 |
| 4,661,038 | 4/1987 | Kohler et al. | 248/900 |

FOREIGN PATENT DOCUMENTS

| 2921021 | 11/1979 | Fed. Rep. of Germany | 409/134 |
|---|---|---|---|
| 1140930 | 2/1985 | U.S.S.R. | 409/241 |

Primary Examiner—Robert P. Olszewski
Assistant Examiner—William E. Terrell
Attorney, Agent, or Firm—Shlesinger & Myers

[57] ABSTRACT

A break away machine tool assembly includes a support to which a bearing plate is pivotally mounted in overlying and contiguous relation. A tool element overlies and is contiguous the plate and is movable therewith. Securement elements releasably secure the plate and the tool element in overlying relation to the support for permitting the plate and the tool element to move relative to the support within a defined range upon being subjected to an impact.

25 Claims, 5 Drawing Sheets

BREAK AWAY TOOL ELEMENT AND METHOD OF MOUNTING

BACKGROUND OF THE INVENTION

A conventional machine tool has a base to which is secured a spindle which rotates the workpiece. The machine may have a tailstock to maintain the workpiece in proper alignment as the workpiece is operated upon by a tool. The tool is typically mounted to a turret which is movable relative to the spindle through a cross-slide. The turret may move parallel to the axis of the workpiece and/or transverse thereto. Proper operation of the machine tool requires that the various elements cooperate in a manner which assures good part repeatability.

The tailstock and turret are, as noted, movable both toward and away from the spindle. Additionally, the turret is movable toward the tailstock, thereby presenting the possibility of contacting the tailstock should the machine be improperly programmed or should a malfunction occur. The ever increasing speed with which the tailstock and cross-slide move have necessitated the use of accurately aligned track systems upon which to move. For example, linear ways have now become conventional because they permit the tailstock and turret to move with speeds in excess of several hundred inches per minute.

The use of linear ways, however, requires that they be accurately initially aligned, and maintained in alignment. Should the ways get out of alignment or otherwise become distorted, then the relevant tool element will not properly move therealong. One cause of misalignment or damage to the ways is through impact of the turret with the tailstock, or other tool element used in place of the tailstock.

Should the linear ways become damaged, such as by a collision between the turret and the tailstock, then it has previously been necessary for those ways to be replaced for the machine to once again be capable of functioning with the tolerances required. Removal and replacement of the linear ways is a time consuming process, normally requiring in excess of one day. During that period, the machine tool is not operating and thereby represents a loss of productive assets.

In view of the above, it can be seen that there is a need for a tool element mounting system which alleviates the time consuming process of way replacement in the event of a collision between the turret and the tailstock. The disclosed invention is a method of mounting a tool element in order to prevent damage to the linear ways by permitting the tailstock or other such tool element to move relative to those ways, and to be replaced rapidly and in accurate alignment.

OBJECTS AND SUMMARY OF THE INVENTION

The primary object of the disclosed invention is a break away machine tool assembly and method of mounting which prevents damage to the machine tool ways and which permits the tailstock or other similar tool element to be rapidly repositioned and accurately aligned in order to avoid excessive down time while assuring good part repeatability.

A break away machine tool assembly according to the invention comprises a support. A bearing plate overlies the support and is contiguous thereto and is movable relative thereto. A tool element overlies and is contiguous the plate and is movable therewith. Means releaseably secure the plate and the element in overlying relation to the support for permitting the plate and the element to move relative to the support within a defined range upon being subjected to an impact.

A machine tool assembly comprises a base to which a headstock is mounted at one end thereof and the headstock includes means rotatable on a first axis for gripping and releasing work. A first tool element is displaceably mounted to the base and includes a work engaging portion coaxial with the first axis and the first tool element is movable on a second axis parallel to the first axis. A second tool element is displaceably mounted to the base and includes a work engaging portion. The second tool element is movable on a third axis parallel to the first axis and also on a fourth axis generally transverse to the first axis. The first tool element includes a support, a bearing plate overlying and contiguous the support, tool means overlying and contiguous the plate, and means releaseably secure the plate and the tool means in overlying relation to the support for permitting the plate and the tool means to move relative to the support within a defined range upon the first and second tool elements contacting each other.

The method of mounting a machine tool element to prevent damage to the ways comprises the steps of providing a support movable along the machine tool base. Overlying the support is a bearing plate which is also contiguous therewith. Overlying the bearing plate and contiguous therewith is a tool element. Securing the bearing plate and tool element to the support is accomplished through releaseable securing means which permit the bearing plate and the tool element to move relative to the support within a defined range upon the plate and the tool element being subjected to impact.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 8 is an elevational view, partially in section, of the pivot post of the invention;

DESCRIPTION OF THE INVENTION

Figure 1:
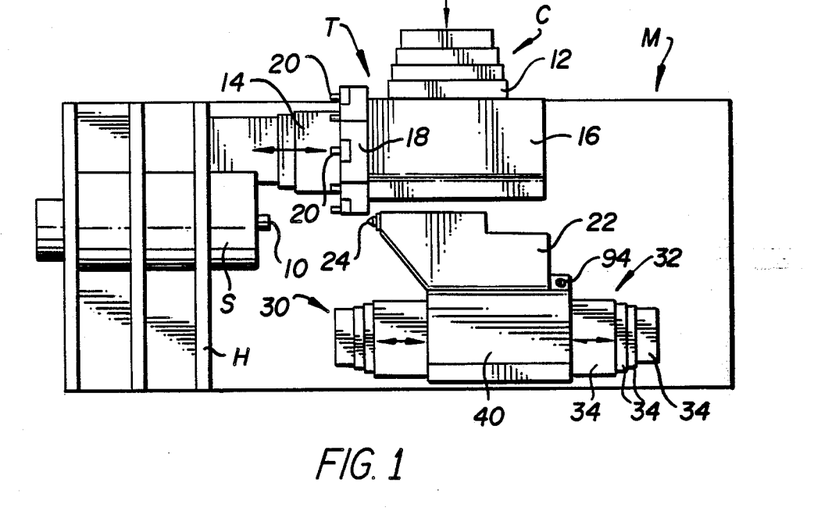
FIG. 1 is a plan view of a machine tool according to the invention with arrows indicating direction of movement.

Machine tool M, as best shown in FIG. 1, includes a base B to one end of which headstock H is mounted. Headstock H include a spindle assembly S with a rotary work holder, such as collet 10. The base B may, in certain instances, be disposed at a substantial angle to the horizontal in order to permit cuttings and the like to slide along the base B in order to facilitate removal.

Turret assembly T is movably mounted on cross-slide C. The cross-slide C include telescoping means 12 permitting the turret assembly T to move generally transverse to the axis of collet 10 and furthermore includes telescoping means 14 permitting movement parallel to the axis of collet 10. The turret assembly T has a motor 16 to which indexable tool holding head 18 is mounted. The head 18 carries a number of tools 20 in order to permit a piece of work rotated by the collet 10 to be operated on, and to thereby achieve a desired shape, configuration or the like. The motion of the turret assembly T parallel and transverse to the axis of the collet 10 permits the tools 20 to be moved longitudinally and transversely of the workplace.

Figure 2:
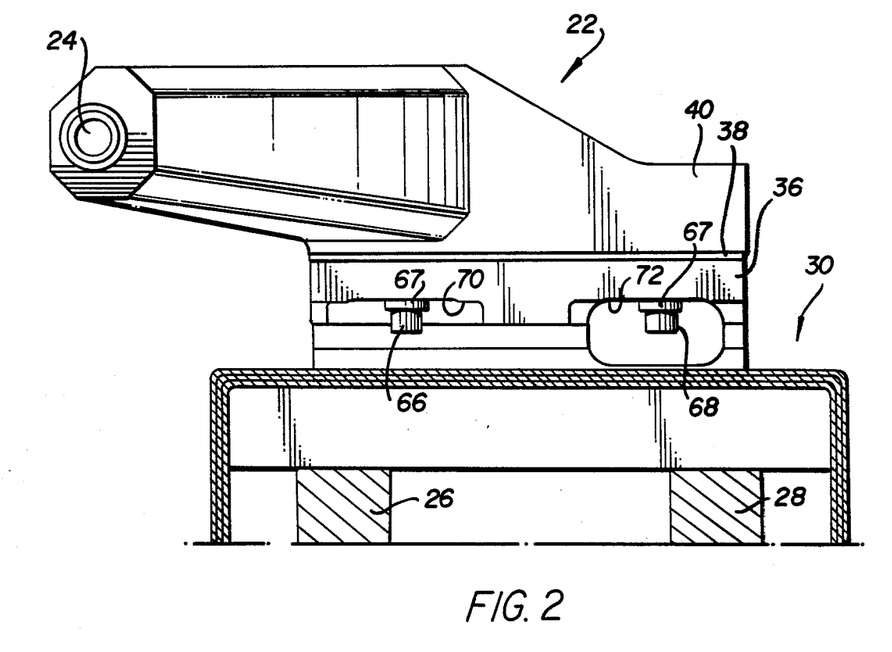
FIG. 2 is a cross-sectional view taken along the section 2—2 of FIG. 1 and with portions broken away for clarity.

Tailstock 22 is similarly mounted to base B for reciprocation toward and away from collet 10. The tailstock 22 has a work engaging portion 24 which is coaxial with the axis of rotation of collet 10. The tailstock 22 is movable upon spaced parallel ways 26 and 28, as best shown in FIG. 2. The ways 26 and 28 permit rapid movement of the tailstock 22 toward and away from the collet 10. The ways 26 and 28 must remain in proper longitudinal spaced parallel alignment in order to permit rapid movement to occur. For this reason, way cover systems 30 and 32 are operably connected to and movable with tailstock 22 and extend therefrom for overlying and protecting ways 26 and 28. In this way, dirt, debris and the like cannot contaminate the ways 26 and 28. Preferably, each of the way cover systems 30 and 32 comprises a plurality of U-shaped covers 34 which are nested one in another in order to achieve a telescopic action as the tailstock 22 moves.

Support 36, as best shown in FIG. 2, is secured to way cover systems 30 and 32. Bearing plate 38 overlies and is contiguous with support 36. The bearing plate 38 is, preferably, comprised of stainless steel and a non-water soluble lubricant is disposed between the plate 38 and the support 36 in order to prevent galling and to permit movement of the plate 38 relative to the support 36. The tailstock 22 has a base portion 40 which overlies and is contiguous with plate 38. Preferably, a non-water soluble lubricant is disposed between the base portion 40 and the plate 38 for like reasons.

Figure 7:
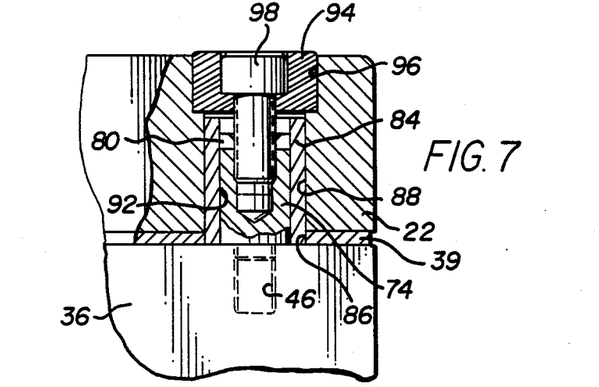
FIG. 7 is a fragmentary cross-sectional view of the pivot mechanism used with the invention, the section being taken along the lines 7—7 of FIG. 5 and viewed in the direction of the arrows.
Figures 8, 11:
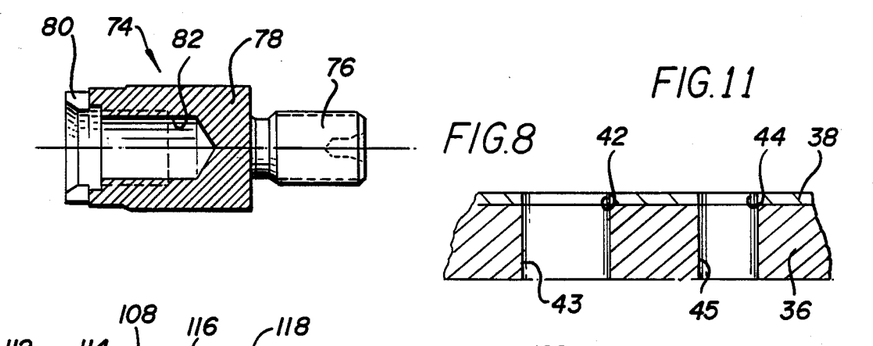

The plate 38 has a pair of oval slots 42 and 44 which are juxtaposed one to the other with slots 43 and 45 in the support 36, respectively, as best shown in FIG. 11. The slots 42 and 44 are aligned with the slots 43 and 45 when the tailstock 22 is in the operating configuration of FIG. 1. The support 36 and the plate 38 also have aligned openings 46 and 86 in one corner thereof, as best shown in FIG. 7. It can be noted in FIG. 4 that the slots 42, 43 and 44, 45 are disposed adjacent forward edge 48. Each of the slots 42, 43 and 44, 45 is angularly offset from the edge 48 in order to facilitate pivoting of the plate 38 around the openings 46 and 88. In this regard, the slots 44 and 45 are at a sharper angle to the edge 48 than are the slots 42 and 43 because the slots 44 and 45 are at a greater distance from the pivot axis defined by the openings 46 and 88 than are the slots 42 and 43.

Figure 3:
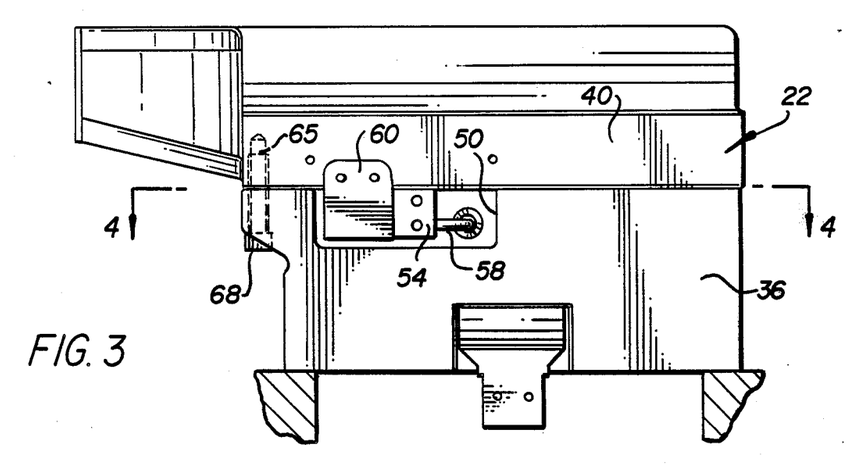
FIG. 3 is an elevational view, with portions broken away, of the tailstock of FIG. 1.
Figure 4:
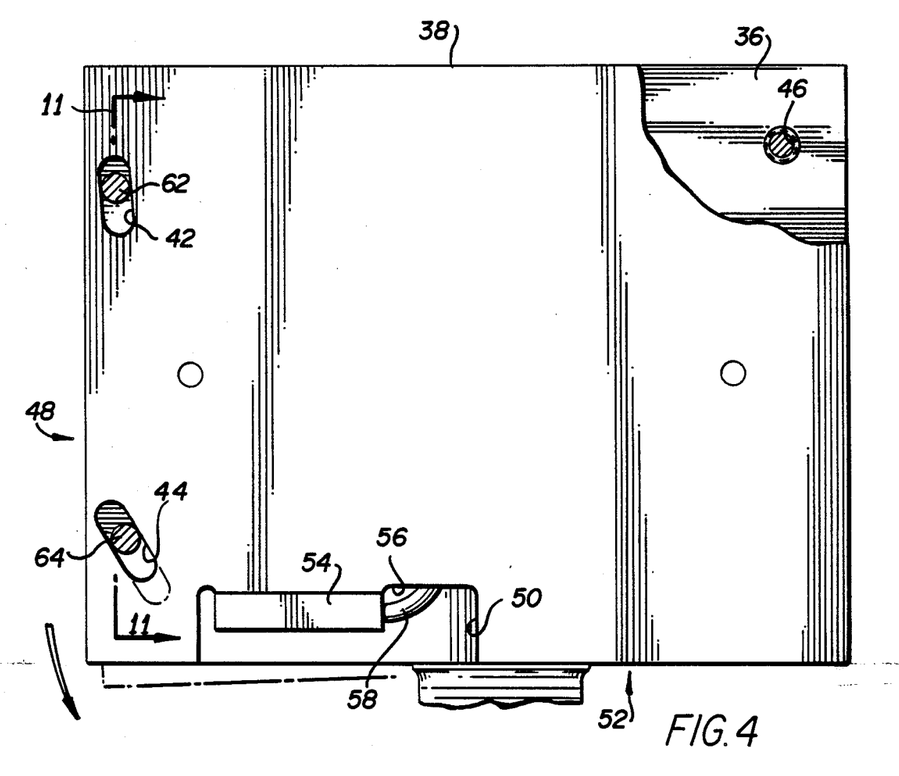
FIG. 4 is a cross-sectional view taken along the section 4—4 of FIG. 3 and viewed in the direction of the arrows and with arrows and dotted lines indicating movement.
Figure 5:
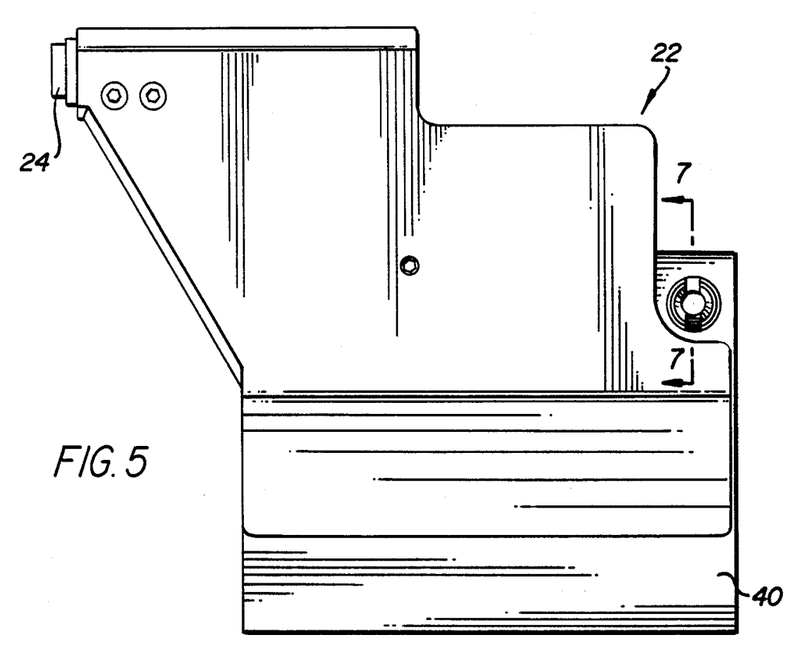
FIG. 5 is a plan view of the tailstock of FIG. 1.

FIGS. 3 and 4 disclose recess 50 in support 36 along lower edge 52 thereof. The edge 52 is, in the normal operating position of FIG. 1, parallel to the axis of rotation of the collet 10, while the edge 48 extends generally transverse thereto. Proximity switch 54 is mounted in recess 50 and is disposed below plate 38. The plate 38 has a cut-out portion 56 which corresponds to the configuration of the recess 50. In this way, movement of the plate 38 about the axis of pivoting defined by the openings 46 and 88 is sensed by the proximity switch 54. When the proximity switch 54 senses movement of the plate 38, then a signal to that effect is sent by cable 58 to the automatic controls (not shown) of the machine M. FIG. 3 also discloses cover plate 60 which is secured to base portion 40 and protects the proximity switch 54.

Bolts 62 and 64 are secured in tailstock 22 and extend therefrom through the aligned slots 42, 43 and 44, 45, respectively. Each of the bolts 62 and 64 has a threaded portion, only the treaded portion 65 of bolt 64 being shown in FIG. 3, and a head portion and the head portions 66 and 68, respectively, are disposed exteriorly of support 36, as best shown in FIG. 2. Washers 67 are disposed between head portions 66 and 68 and support 36. The support 36 has recessed portions 70 and 72 in order to permit access to the head portions 66 and 68, respectively, and to washers 67, as best shown in FIG. 2. The bolts 62 and 64 are, preferably, torqued to 40 ft/lbs., in order to secure the plate 38 and tailstock 22 to move relative thereto when subjected to impact. The washers 67 minimize localization of the compression force because their area exceeds that of head portions 66 and 68.

FIG. 8 discloses pivot post 74 which is mounted in the aligned openings 46 and 88. The pivot post 74 has a threaded end portion 76 which is secured within the opening 46. Cylindrical body portion 78 extends upwardly therefrom and terminates in keyways 80. Threaded opening 82 is centrally disposed within body portion 78. The keyways 80 are used for tightening the threaded portion 76 within the support 36.

Figure 9:
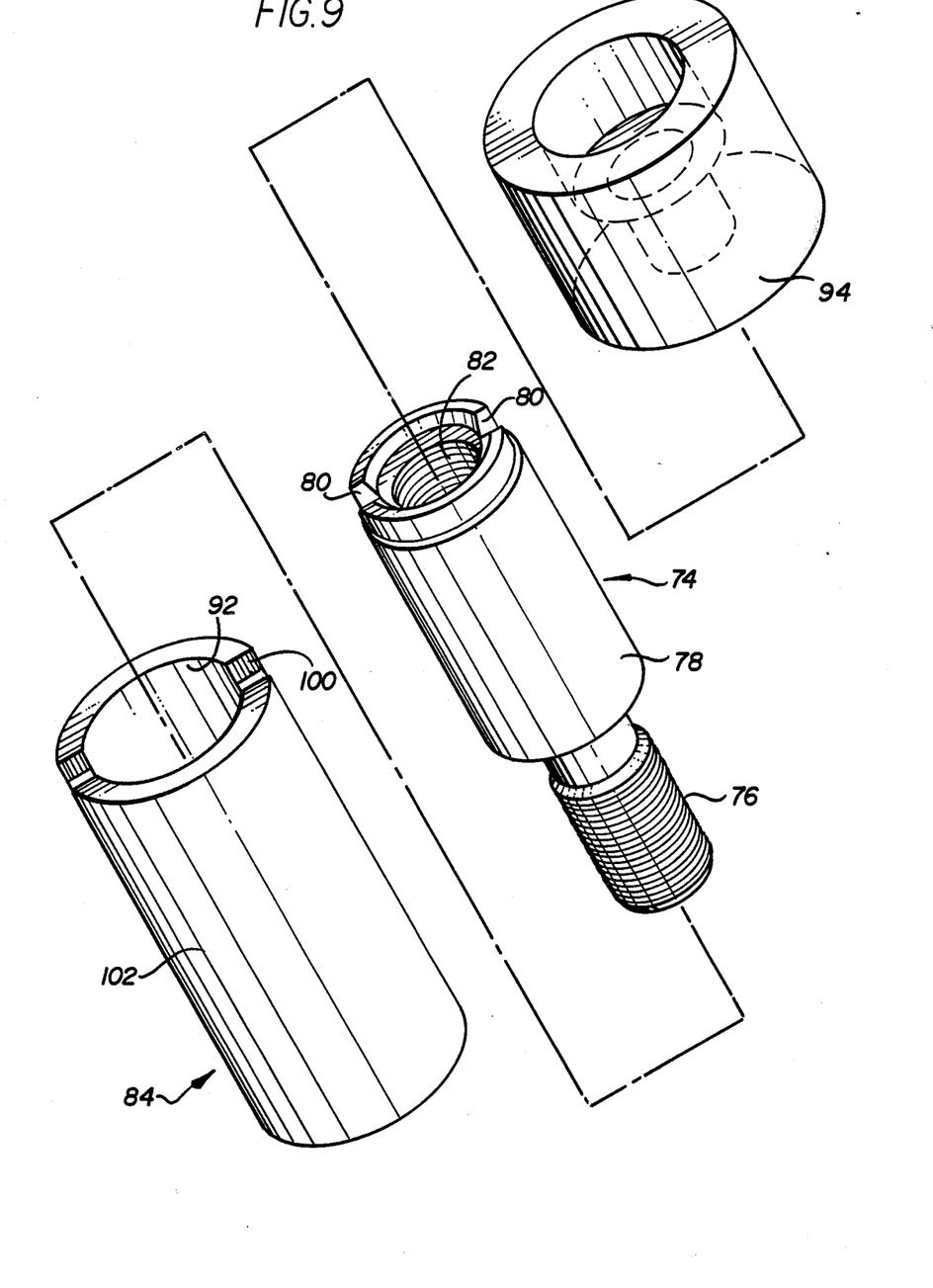
FIG. 9 is an exploded assembly drawing of the pivoting and adjustment mechanism of the invention.

FIGS. 7 and 9 disclose the pivot mechanism of the invention which utilizes the pivot post of FIG. 8. Pivot post 74, as best shown in FIG. 7, is secured within support 36 and extends upwardly therefrom. Eccentric cylinder 84 is mounted about body portion 78 of pivot post 74 and is disposed within apertures 86 and 88. Washer clamp 94 is mounted within enlarged diameter opening 96 which is coaxial with the openings 86 and 88. Bolt 98 extends through washer clamp 94 into central opening 82 and thereby prevents unintended rotation of the eccentric cylinder 84.

Eccentric cylinder 84, as best shown in FIG. 9, has keyways 100 at the upper end thereof. The keyways 100, just as the keyways 80, permit the respective member to be rotated upon the appropriate tool being inserted therein. In this way, the pivot post 74 may be firmly secured to the support 36, or the eccentric cylinder 84 may be rotated.

Eccentric cylinder 84, as suggested by its name has a pair of non-coaxial axes because the axis of the opening 92 is non-coaxial or offset with respect to the axis of the outer wall 102. Consequently, rotation of the eccentric cylinder 84 causes the outer wall 102 to move relative to the axis of rotation of the opening 92. Movement of the outer wall 102 relative to the axis of rotation of the eccentric cylinder 84, as defined by the axis of the opening 92, causes the outer wall 102 to engage the inner walls defined by the openings 86 and 88 and to thereby displace the plate 38 and tailstock 22. Consequently, it is possible to adjust the alignment of the work engaging portion 24 of the tailstock 22 by suitable rotation of the eccentric cylinder 84. It should be noted that the tailstock 22 and plate 38 move substantially linearly with respect to support 36 and the axis of collet 10, rather than being pivoted.

As noted, the washer clamp 94 and its bolt 98 prevent access to pivot post 74 and the eccentric cylinder 84. Should adjustment of the work engaging portion 24 be required, then it is necessary to loosen the bolts 62 and 64, as well as to remove the washer clamp 94 and its bolt 98. The work engaging portion 24 may then be adjusted relative to the axis of collet 10 by rotation of the eccentric cylinder 84 until proper alignment is achieved. Once properly aligned, then the bolt 62 and 64 should then again be properly torqued and the washer clamp 94 and the bolt 98 replaced.

Figure 6:
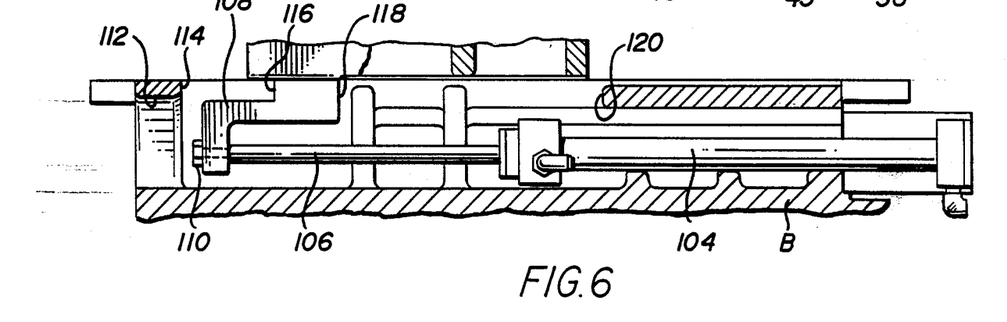
FIG. 6 is a fragmentary cross-sectional view taken along the section 6—6 of FIG. 1.

FIG. 6 discloses cylinder 104 and piston 106 used to drive the tailstock 22 toward and away from the spindle assembly S. The piston 106 is secured to member 108, such as by bolt 110. The member 108 is operably connected with tailstock 22 so that extension and retraction of piston 106 causes corresponding movement of the tailstock 22, as well as telescoping operation of the way cover assemblies 30 and 32. It can be noted in FIG. 6 that base B has an opening 112 at one end thereof which is sized to permit the member 108 to pass therethrough. Ledge 114 receives the recessed portion 116 of member 108 and thereby provides a positive forward stop for assuring that the tailstock 22 is in a known position. Rear portion 118 of member 108 is engageable with shoulder 120 in order to provide a positive rear stop for like reasons.

The stops provided by ledge 114 and shoulder 120 permit the machine M to use an hydraulic cylinder 104 for causing reciprocation of the tailstock 22 in a manner which avoids the previous complex servomechanisms and the like. The shoulder 120 assures that the tailstock 22 is in a known position when the piston 106 is fully retracted.

Figure 10:
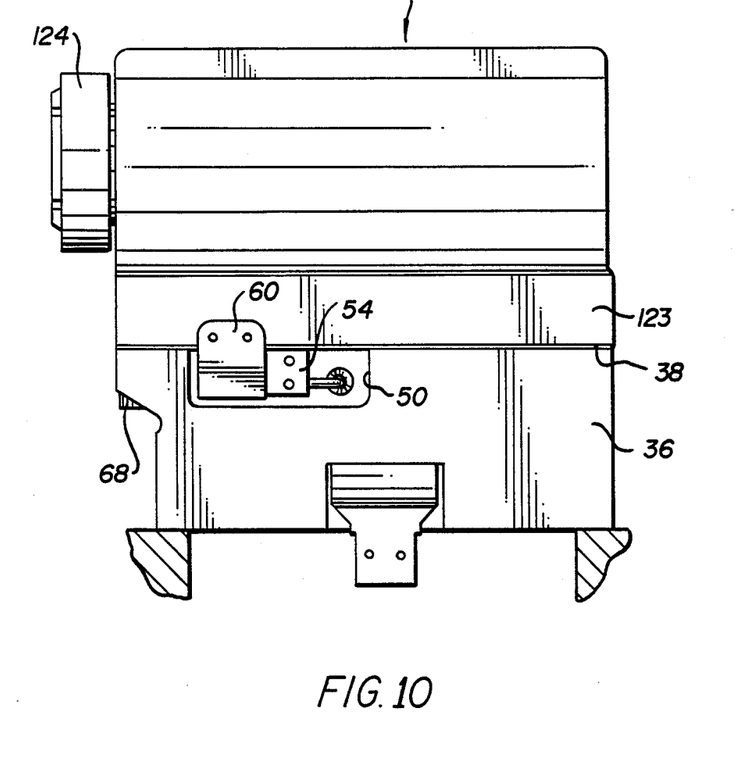
FIG. 10 is an elevational view of a secondary spindle used in place of the tailstock of FIG. 5; and, FIG. 11 is a fragmentary cross-sectional view taken along the section 11—11 of FIG. 4.

FIG. 10 discloses a secondary spindle assembly 122 mounted to support 36 and plate 38 through base 123. The secondary spindle assembly 122 includes a rotary spindle mechanism 124 comprising a collet or similar work holding element which thereby permits the workpiece to be exchanged between the collet 10 and the spindle 124. In this way, it is possible to permit the tools 20 to operate on both end portions of a particular piece of work. Naturally, secondary spindle assembly 122 includes the necessary drive motor and operating mechanisms needed to assure operation of the mechanism 124.

The secondary spindle assembly 122 is normally utilized with the piston 106 in the fully retracted position. Therefore, the machine controls (not shown) are always sure of the location of the workpiece (not shown). It is merely necessary to move the turret assembly T relative to the secondary spindle assembly 122 in order to complete the part.

As previously explained, the tailstock 22 and the turret assembly T move very rapidly with respect to each other and with respect to the base B. The machine tool M is, customarily, either manually operated or operated by means of a programmed control system. Should an error in the programming or manual operation occur, then it is possible for the turret assembly T to engage the tailstock 22 with substantial force. In the event of such an impact, then the bolts 62 and 64 which secure the plate 38 and the tailstock 22 in contiguous overlying relation to support 36, move in the slots 42, 43 and 44, 45 and thereby permit the plate 38 and the tailstock 22, or the secondary spindle 122, to move relative to the support 36. Movement of the plate 38 and the tailstock 22 relative to the support 36 prevents the ways 26 and 28 from being damaged, and thereby the machine M be rendered unserviceable.

As noted, the slots 42, 43 and 44, 45 are angularly disposed relative to the edge 48 and thereby permit the plate 38 and the tailstock 22 or the secondary spindle 122 to pivot about pivot post 74. The pivoting action occurs within a defined range of amplitude by reason of the proximity switch 54 and the force absorbed by bolts 62 and 64 prior to and when being moved in the slots. Once the proximity switch 54 senses movement of the plate 38, then the controls (not shown) of the machine tool M are notified and all further action is stopped. This emergency stop feature prevents further damage to the machine M and assures that the ways 26 and 28 are not damaged. The heads 66 and 68 and washers 67, by being free to slide within the recessed portion 70 and 72, are likewise not damaged. This facilitates realignment of the tailstock T or the secondary spindle 122 should a collision occur. Also, slots 42, 43 and 44, 45 are sufficiently long to permit the impact force to be absorbed without the bolts 62 and 64 striking an end portion thereof and becoming bent or broken.

Should a collision between the turret assembly T and the tailstock 22 or secondary spindle 122 occur, then it is possible to once again have the machine tool M useable within a very short period because the ways 26 and 28 have been prevented from becoming damaged. It is merely necessary to loosen the bolts 62 and 64 and to swing the plate 38 and the tailstock 22 or secondary spindle 122 into general alignment with the axis of rotation of the collet 10. The eccentric cylinder 84 is then rotated in order to achieve proper alignment between the work engaging portion 24 or the axis of rotation of the spindle 124 with the axis of rotation of the collet 10. Once proper alignment has been achieved, then the bolts 62 and 64 are once again torqued to 40 ft/lbs., or whatever torque is required, and the washer clamp 94 and bolt 98 replaced. The entire procedure requires just a few minutes, as opposed to the two days or more required with prior systems.

While we prefer the use of pivot post 74 in order to permit the plate 38 and tailstock 22 to pivot, it should be clear that the post 74 could be replaced with a further bolt and slot combination. In that event, the plate 38 and tailstock 22 would move linearly, or in any desired direction, but there would be no adjustment feature. The adjustment feature is important, in our opinion, in order to accommodate wear, and to permit a tailstock to be replaced with another tailstock from inventory.

While the invention has been described has having a preferred design, it is understood that it is capable of further modifications, uses, and/or adaptations of the invention, following in general the principle of the invention, and including such departures from the present disclosure as come within known or customary practice in the art to which the invention pertains, and as may be applied to the central features hereinbefore set forth, and fall within the scope of the invention of the limits of the appended claims.

What we claim is:

1. Break away machine tool assembly, comprising:
   (a) a support;
   (b) a bearing plate overlying and contiguous said support and movable relative thereto;
   (c) a tool element overlying and contiguous said plate and movable therewith;
   (d) means releasably secure said plate and said element in overlying relation to said support for permitting said plate and said element to move relative to said support within a defined range upon being subject to an impact;
   (e) said releasable securing means includes a plurality of corresponding cooperating slots disposed in said support and said plate, a plurality of securement elements extend from said tool element through said plate and said support slots and said securement elements are movable relative to said support slots for permitting said plate and said tool element to move relative to said support, and there are at least two longitudinally extending slots in said support and each slot is angularly disposed relative to the other slot;
   (f) three securement elements extend from said tool element and said securement elements are triangularly disposed; and,
   (g) two of said securement elements extend through said slots and the remaining securement element defines a pivot axis for said plate and said tool element.

2. The assembly of claim 1, wherein:
   (a) said releasable securing means permit said plate and said element to pivot relative to said support.

3. The assembly of claim 2, wherein:
   (a) said releasable securing means comprise a plurality of securement elements, one of said elements defining a pivot axis for said plate and said tool element.

4. The assembly of claim 3, wherein:
   (a) there are three triangularly disposed securement elements.

5. The assembly of claim 1, wherein:
   (a) said tool element is a tailstock.

6. The assembly of claim 1, wherein:
   (a) said tool element is a spindle assembly.

7. The assembly of claim 1, wherein:
   (a) each of said securement elements includes bolt means.

8. The assembly of claim 1, wherein:
   (a) said remaining securement element includes means for permitting said plate and said tool element to move generally linearly relative to said support.

9. The assembly of claim 8, wherein said means permitting linear movement includes:
   (a) a cylindrical opening extending through said tool element;
   (b) a pivot post secured in said support and extending therefrom in said opening; and,
   (c) an eccentric member rotatably mounted about said pivot post and within said opening so that rotation thereof causes linear displacement of said plate and said tool element.

10. The assembly of claim 9, wherein:
    (a) a key way is disposed in an end portion of said eccentric member and is adapted for receipt of a tool for thereby permitting rotation of said member.

11. The assembly of claim 9, wherein:
    (a) means removably cover said opening for preventing unintended access to said eccentric member.

12. The assembly of claim 1, wherein:
    (a) means are operably associated with said support for detecting movement of said plate and for thereby signaling an emergency condition.

13. The assembly of claim 12, wherein:
    (a) said detecting means includes a proximity switch sensitive to the material comprising said plate.

14. The assembly of claim 1, wherein:
    (a) two of said securement elements and the associated slots are associated with a forward edge portion of said plate and said support.

15. A machine tool assembly, comprising:
    (a) a base;
    (b) a headstock mounted to said base at one end thereof and including means rotatable on a first axis for gripping and releasing work;
    (c) a first tool element displaceably mounted to said base and including a first work engaging portion coaxial with said first axis and said first tool element movable on a second axis parallel to said first axis;
    (d) a second tool element displaceably mounted to said base and including a second work engaging portion, said second tool element movable on a third axis parallel to said first axis and on a fourth axis generally transverse to said first axis;
    (e) said first tool element includes a support, a bearing plate overlying and contiguous said support, tool means overlying and contiguous said plate, and means releasably secure said plate and said tool means in overlying relation to said support for permitting said plate and said tool means to move relative to said support within a defined range upon said first and second tool elements contacting each other;
    (f) first and second corresponding and cooperating slots in said support and said plate; and,
    (g) said releasable securing means includes at least three securement elements extending from said tool means and disposed in a triangular array, two of said securement elements extend through said corresponding and cooperating slots and the remaining securement element pivotally mounts said tool means to said plate and said support.

16. The assembly of claim 15, wherein:
    (a) said tool means includes a tailstock.

17. The assembly of claim 15 wherein:
    (a) said tool means includes a spindle.

18. The assembly of claim 15, wherein:
    (a) said first and second slots of said support and plate are non-coaxial.

19. The assembly of claim 15, wherein:
    (a) said two securement elements each include a bolt having a head portion engaged with said support, and said bolts having been tightened so as to exert a predetermined pressure on said plate.

20. The assembly of claim 15, wherein:

(a) said remaining securement element includes means for adjusting said plate and said tool means so that said first work engaging portion remains coaxial with said first axis.

21. The assembly of claim 20, wherein said means for adjusting includes:
    (a) aligned openings in said plate and said tool means;
    (b) a pivot assembly secured to said base and extending through said opening; and,
    (c) an eccentric member mounted about said pivot assembly and positioned in said openings so that rotation thereof causes selective engagement thereof with said plate and said tool means and thereby movement of said plate and said tool means.

22. The assembly of claim 15, wherein:
    (a) cylinder and piston means are operably associated with said base and have a movable portion operably connected with said first tool element for causing displacement thereof.

23. The assembly of claim 15, wherein:
    (a) means are operably associated with said gripping and releasing means and said tool elements and are carried by said support for detecting movement of said plate and for stopping operation of said gripping and releasing means and preventing further movement of said tool elements when a predetermined movement is detected.

24. The assembly of claim 23, wherein:
    (a) said detecting means includes a proximity switch sensitive to the material of which said plate is comprised.

25. The assembly of claim 24, wherein:
    (a) said plate is comprised of stainless steel.

* * * * *